(12) United States Patent
Hu et al.

(10) Patent No.: US 11,535,913 B2
(45) Date of Patent: Dec. 27, 2022

(54) MULTI-MATERIAL COMPONENT AND METHODS OF MAKING THEREOF

(71) Applicant: Honda Motor Co., Ltd., Tokyo (JP)

(72) Inventors: Jianxun Hu, Dublin, OH (US); Eric Walker, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 66 days.

(21) Appl. No.: 16/844,786

(22) Filed: Apr. 9, 2020

(65) Prior Publication Data

US 2020/0255925 A1 Aug. 13, 2020

Related U.S. Application Data

(63) Continuation of application No. 15/660,025, filed on Jul. 26, 2017, now Pat. No. 10,640,854.

(60) Provisional application No. 62/525,314, filed on Jun. 27, 2017, provisional application No. 62/395,790, filed on Sep. 16, 2016, provisional application No. 62/371,032, filed on Aug. 4, 2016.

(51) Int. Cl.
| | |
|---|---|
| *C22C 30/00* | (2006.01) |
| *B23K 26/323* | (2014.01) |
| *B23K 10/02* | (2006.01) |
| *B23K 9/23* | (2006.01) |
| *B23K 15/00* | (2006.01) |
| *B23K 31/02* | (2006.01) |
| *B23K 35/02* | (2006.01) |
| *B23K 103/20* | (2006.01) |
| *B23K 101/00* | (2006.01) |
| *B23K 35/24* | (2006.01) |

(52) U.S. Cl.
CPC .............. *C22C 30/00* (2013.01); *B23K 9/232* (2013.01); *B23K 10/02* (2013.01); *B23K 15/0093* (2013.01); *B23K 26/323* (2015.10); *B23K 31/02* (2013.01); *B23K 35/0261* (2013.01); *B23K 35/24* (2013.01); *B23K 2101/006* (2018.08); *B23K 2103/20* (2018.08); *Y10T 428/12958* (2015.01)

(58) Field of Classification Search
None
See application file for complete search history.

(56) References Cited

U.S. PATENT DOCUMENTS

| | | | |
|---|---|---|---|
| 2,481,614 | A | 9/1949 | Redmond |
| 2,914,641 | A | 11/1959 | Yuhasz |

(Continued)

FOREIGN PATENT DOCUMENTS

| | | |
|---|---|---|
| CN | 101284339 A | 10/2008 |
| CN | 101590574 | 12/2009 |

(Continued)

OTHER PUBLICATIONS

Liming Liu et al. "A Review of Dissimilar Welding Techniques for Magnesium Alloys to Aluminum Alloys", Materials, 2014, vol. 7, pp. 3735-3757.

(Continued)

*Primary Examiner* — Xiaobei Wang
(74) *Attorney, Agent, or Firm* — Rankin, Hill & Clark LLP

(57) ABSTRACT

A multi-material component joined by a high entropy alloy is provided, as well as methods of making a multi-material component by joining dissimilar materials with high entropy alloys.

20 Claims, 6 Drawing Sheets

(56) References Cited

U.S. PATENT DOCUMENTS

| | | | |
|---|---|---|---|
| 5,858,131 A | 1/1999 | Inoue et al. | |
| 6,056,802 A | 5/2000 | Kita et al. | |
| 6,123,899 A | 9/2000 | Setzer et al. | |
| 6,296,953 B1 | 10/2001 | Lindén et al. | |
| 6,436,339 B1 | 8/2002 | Maziasz et al. | |
| 6,692,585 B2 | 2/2004 | Uehara et al. | |
| 6,783,730 B2 | 8/2004 | Lin et al. | |
| 7,700,198 B2 | 4/2010 | Takeda et al. | |
| 7,767,314 B2 | 8/2010 | Kodama et al. | |
| 7,815,850 B2 | 10/2010 | Baker et al. | |
| 8,221,899 B2 | 7/2012 | Takeda et al. | |
| 8,337,998 B2 | 12/2012 | Takeda et al. | |
| 8,487,210 B2 | 7/2013 | Specht et al. | |
| 8,641,835 B2 | 2/2014 | Yamana et al. | |
| 8,647,450 B2 | 2/2014 | Kikuchi et al. | |
| 8,815,027 B2 | 8/2014 | Ishida et al. | |
| 8,999,233 B2 | 4/2015 | Baker | |
| 9,150,945 B2 | 10/2015 | Bei | |
| 9,999,939 B2 | 6/2018 | Wang et al. | |
| 2002/0159914 A1 | 10/2002 | Yeh | |
| 2004/0261916 A1 | 12/2004 | Lin et al. | |
| 2005/0218121 A1 | 10/2005 | Hayashi et al. | |
| 2007/0154342 A1 | 7/2007 | Tu et al. | |
| 2008/0292489 A1* | 11/2008 | Yamamoto | C22C 38/06 420/38 |
| 2009/0017328 A1 | 1/2009 | Katoh et al. | |
| 2009/0110955 A1 | 4/2009 | Hartmann et al. | |
| 2010/0218858 A1 | 9/2010 | Baker et al. | |
| 2011/0041967 A1 | 2/2011 | Baker et al. | |
| 2011/0058980 A1* | 3/2011 | Lee | C22C 30/04 420/587 |
| 2011/0305506 A1 | 12/2011 | Breitenbach et al. | |
| 2012/0003114 A1 | 1/2012 | Baker et al. | |
| 2012/0263971 A1 | 10/2012 | Aindow et al. | |
| 2012/0301309 A1 | 11/2012 | Nishioka et al. | |
| 2013/0299038 A1 | 11/2013 | Specht et al. | |
| 2014/0086785 A1 | 3/2014 | Claude et al. | |
| 2014/0097277 A1 | 4/2014 | Kumta et al. | |
| 2014/0131338 A1 | 5/2014 | Postle | |
| 2014/0286821 A1 | 9/2014 | Baker et al. | |
| 2015/0096962 A1 | 4/2015 | Sigler et al. | |
| 2015/0275340 A1 | 10/2015 | Berry et al. | |
| 2016/0025386 A1 | 1/2016 | Barabash et al. | |
| 2016/0158898 A1* | 6/2016 | Wiehl | B23K 35/3006 148/528 |
| 2016/0201169 A1 | 7/2016 | Vecchio et al. | |
| 2016/0279732 A1 | 9/2016 | Sigler et al. | |
| 2017/0297136 A1 | 10/2017 | Brown et al. | |
| 2017/0326690 A1 | 11/2017 | Heard et al. | |
| 2017/0369970 A1 | 12/2017 | Yeh et al. | |
| 2018/0036884 A1 | 2/2018 | Chen et al. | |
| 2018/0037968 A1* | 2/2018 | Hiraide | C22C 38/48 |
| 2018/0056432 A1 | 3/2018 | Lindner et al. | |
| 2018/0363104 A1 | 12/2018 | Fujieda et al. | |

FOREIGN PATENT DOCUMENTS

| | | |
|---|---|---|
| CN | 101554685 B | 7/2011 |
| CN | 101554686 B | 11/2011 |
| CN | 102672328 | 9/2012 |
| CN | 103060797 | 4/2013 |
| CN | 102676904 B | 10/2013 |
| CN | 103567663 A | 2/2014 |
| CN | 103567663 B | 7/2015 |
| CN | 103567654 B | 9/2015 |
| CN | 103252568 B | 1/2016 |
| CN | 103556146 B | 1/2016 |
| CN | 105401038 | 3/2016 |
| CN | 103639619 B | 4/2016 |
| CN | 104476010 B | 6/2016 |
| CN | 104476011 B | 6/2016 |
| CN | 106086580 A | 11/2016 |
| CN | 107686928 A | 2/2018 |
| DE | 102017007943 A1 | 2/2018 |
| JP | H11197846 A | 7/1999 |
| JP | 2002173732 A | 6/2002 |
| JP | 2004223548 A | 8/2004 |
| JP | 2008231493 A | 10/2008 |
| WO | WO2013077113 | * 5/2013 |
| WO | WO2017098848 A1 | 6/2017 |
| WO | WO2017109541 A1 | 6/2017 |
| WO | WO2017164602 A1 | 9/2017 |

OTHER PUBLICATIONS

Fanling Meng et al. "The effects of chromium on the microstructure and tensile behavior of Fe30Ni20Mn35Al15" Materials Science & Engineering A, 2013, vol. 586, pp. 45-52.

K.G. Pradeep et al. "Non-equiatomic high entropy alloys: Approach towards rapid alloy screening and property-oriented design", Materials Science & Engineering A, 2015, vol. 648, pp. 183-192.

Woei-Ren Wang, et al. "Effects of Al addition on the microstructure and mechanical property of AlxCoCrFeNi high-entropy alloys", Intermetallics, 2012, vol. 26, pp. 44-51.

Hsuan-Ping Chou, "Microstructure, thermophysical and electrical properties in AlxCoCrFeNi ($0 \leq x \leq 2$) high-entropy alloys", Materials Science and Engineering B, 2009, vol. 163, pp. 184-189.

Tengfei Yang et al. "Precipitation behavior of AlxCoCrFeNi high entropy alloys under ion irradiation", Scientific Reports, Aug. 26, 2016, vol. 6, 32146, Nature Publishing Group.

S. W. Wu et al. "Strong grain-size effect on deformation twinning of an Al0.1CoCrFeNi high-entropy alloy". Materials Research Letters, Nov. 21, 2016, 5:4, 276-283, DOI: 10.1080/21663831.2016.1257514.

Tieshan Cao et al. "The influence of Al elements on the structure and the creep behavior of AlxCoCrFeNi high entropy alloys". Materials Letters, 2016, 1vol. 64, pp. 344-347.

Dongyue Li et al. "The ultrahigh charpy impact toughness of forged AlxCoCrFeNi high entropy alloys at room and cryogenic temperatures", Intermetallics, 2016, vol. 70, pp. 24-28.

Yunzhu Shi et al. "Corrosion-Resistant High-Entropy Alloys: A Review", Metals, 2017, vol. 7(2), 43: DOI:10.3390.

Zhi Tang, "Processing, Microstructures, and Mechanical Behavior of High-Entropy Alloys", Dec. 2012, University of Tennessee, Knoxville.

Wikipedia, "High Entropy Alloys", http://en.wikipedia.org/wiki/Hight_entropy_alloys Accessed Jun. 21, 2019.

Miracle et al., "Expolation and Development of High Entropy for Structural Applications", Jan. 10, 2014, Entrophy, vol. 16, pp. 494-525 (Year:2014).

Gali et al., "Tensile Properties of high- and medium- entrophy alloys", Apr. 18, 2013, Intermetallics, vol. 39, pp. 74-78 (Year: 2013).

Vip, "Spot Welding vs. TIG/MIG Welding", http://www.vista-industrial.com/blog/spot-welding/, Sep. 21, 2012, accessed Jun. 21, 2019. (Year: 2012).

Yeh et al., "Nanostructure High-Entropy Alloys with Multiple Principal Elements: Novel Alloy Design Concepts and Outcomes", 2004, Advanced Engineering Materials, vol. 6 No. 5, pp. 299-302. (Year: 2004).

Qibin Liu et al., "Laser Preparation and Application of Advanced Materials", Metallurgical Industry Press, 2016, pp. 192-193.

Jinfeng Xu et al. "Foundry Technology", Design and Preparation of Welding Materials Applied to Welding Titanium and Steel Based on Weldmetal High Entropy Converting, 2014, pp. 2674-2676. (Includes English Abstract).

Guoyin Zu. "Preparation Theory and Technology of Layered Metal Composite Materials", Northeast University Press, 2013, pp. 92.

Chinese Office Action of S/N 201710655985.5 dated Jun. 17, 2021, 9 pages.

"Welding of Materials, Volume 2 of Welding Handbook", edited by Welding Society of Chinese Mechanical Engineering Society, p. 604, Mechanical Industry Press, Dec. 1992. (cited in the Chinese Office Action dated Nov. 15, 2021 and Chinese Search Report dated Nov. 5, 2021).

(56) References Cited

OTHER PUBLICATIONS

Chinese Office Action of S/N 201710655985.5 dated Nov. 15, 2021, 5 pages.
Chinese Search Report of S/N 201710655985.5 dated Nov. 5, 2021, 2 pages.

* cited by examiner

MULTI-MATERIAL COMPONENT AND METHODS OF MAKING THEREOF

CROSS-REFERENCE TO RELATED APPLICATIONS

This application is a continuation of U.S. patent application Ser. No. 15/660,025, entitled "MULTI-MATERIAL COMPONENT AND METHODS OF MAKING THEREOF," filed on Jul. 26, 2017, which claims benefit to U.S. Provisional Patent Application Ser. No. 62/371,032 entitled "MULTI-MATERIAL COMPONENT AND METHODS OF MAKING THEREOF, AND A CONSUMABLE WELDING FILLER AND METHODS OF MAKING AND USING THEREOF," filed on Aug. 4, 2016, U.S. Provisional Patent Application Ser. No. 62/395,790, entitled "MULTI-MATERIAL COMPONENT AND METHODS OF MAKING THEREOF, AND A CONSUMABLE WELDING FILLER AND METHODS OF MAKING AND USING THEREOF," filed on Sep. 16, 2016, and U.S. Provisional Patent Application Ser. No. 62/525,314 entitled "MULTI-MATERIAL COMPONENT AND METHODS OF MAKING THEREOF," filed on Jun. 27, 2017, the disclosure of each above-noted application is incorporated herein by reference.

BACKGROUND

The substitution of lightweight metals or metal alloys for low-carbon steel or other types of steel used in motor vehicles is an attractive option for vehicle mass reduction. Often, however, the remainder of the vehicle body structure is fabricated of a dissimilar material. The joining of dissimilar materials can be problematic due to the differences in physical and metallurgical properties between the two different metals. For example, joining an aluminum or aluminum-based alloy to steel can result in the formation of intermetallic compounds which deteriorate the mechanical properties of the joint and cause corrosion issues, and therefore, requires additional manufacturing steps or safeguards to prevent mechanical strength degradation and galvanic corrosion.

SUMMARY

In general, a high entropy alloy is provided that may be used for joining dissimilar metals or metal alloys. High entropy alloys promote formation of solid solution and prohibit intermetallics especially at high temperatures. As a result, the high entropy alloys provide mechanical strength and corrosion resistance of the welding joint for joining dissimilar materials.

In accordance with one embodiment, a multi-material component is provided that includes a first member comprising a metal or a metal alloy, a second member comprising a metal or a metal alloy, and a third member joining the first member to the second member. The third member comprises a high entropy alloy. Optionally, the metal or metal alloy of the first member is different than the metal or metal alloy of the second member. Optionally, the high entropy alloy comprises a first principal element that is the same as the metal or a base metal of the first member. Optionally, the high entropy alloy comprises a second principal element that is the same as the metal or a base metal of the second member. Optionally, the first member comprises an aluminum alloy and the second member comprises steel. Optionally, the high entropy alloy comprises Al and Fe as principal elements. Optionally, the high entropy alloy comprises Al, Fe, and Mn as principal elements. Optionally, the high entropy alloy comprises five principal elements. Optionally, the high entropy alloy comprises five or more principal elements including: Al, Fe, Mn, Cr, and Ni.

In accordance with one embodiment, a method of making a multi-material component is provided that includes providing a first member comprising a metal or a metal alloy, providing a second member comprising a metal or a metal alloy, positioning a third member at least partially between the first member and the second member, and joining the first member and the second member to the third member. The third member comprises a high entropy alloy. Optionally, the first member and the second member are joined to the third member by welding. Optionally, the metal or metal alloy of the first member is different than the metal or metal alloy of the second member. Optionally, the high entropy alloy comprises a first principal element that is the same as the metal or a base metal of the first member. Optionally, the high entropy alloy comprises a second principal element that is the same as the metal or a base metal of the second member. Optionally, the first member comprises an aluminum alloy and the second member comprises steel. Optionally, the high entropy alloy comprises Al and Fe as principal elements. Optionally, the high entropy alloy comprises Al, Fe, and Mn as principal elements. Optionally, the high entropy alloy comprises five principal elements. Optionally, the high entropy alloy comprises five or more principal elements including: Al, Fe, Mn, Cr, and Ni.

In accordance with one embodiment, a method of making a multi-material component is provided that includes providing a first member comprising a metal or a metal alloy, providing a second member comprising a metal or a metal alloy, and joining the first member to the second member with a material comprising a high entropy alloy or a high entropy alloy precursor composition that forms a high entropy alloy when melted. The joining step may include welding the first member to the second member with the material, or cladding the material over the first member and the second member. Optionally, the metal or metal alloy of the first member is different than the metal or metal alloy of the second member. Optionally, the high entropy alloy comprises a first principal element that is the same as the metal or a base metal of the first member. Optionally, the high entropy alloy comprises a second principal element that is the same as the metal or a base metal of the second member. Optionally, the first member comprises an aluminum alloy and the second member comprises steel. Optionally, the high entropy alloy comprises Al and Fe as principal elements. Optionally, the high entropy alloy comprises Al, Fe, and Mn as principal elements. Optionally, the high entropy alloy comprises five principal elements. Optionally, the high entropy alloy comprises five or more principal elements including: Al, Fe, Mn, Cr, and Ni.

In accordance with one embodiment, a welding consumable is provided that includes a filler material comprising a high entropy alloy or a high entropy alloy precursor composition capable of forming a high entropy alloy when welded. Optionally, the high entropy alloy comprises Al, Fe, and Mn as principal elements. Optionally, the high entropy alloy comprises five principal elements: Al, Fe, Mn, Cr, and Ni.

In accordance with one embodiment, a multi-material component is provided that includes a first member comprising a metal or a metal alloy, a second member comprising a metal or a metal alloy that is different than the metal or the metal alloy of the first member, and a third member joining the first member to the second member, wherein the third member comprises a high entropy alloy. Optionally, the high entropy alloy may comprise a mixing entropy of greater than 1.3R, and optionally may comprise a mixing entropy of greater than 1.5R. Optionally, the high entropy alloy comprises at least four elements each present in the high entropy alloy in an amount of from 5 to 35 atomic %. Optionally two of the at least four elements that are each present in the high entropy alloy in an amount of from 5 to 35 atomic % comprise Fe and Cr and the amount of the Fe and Cr vary by no more than 5 atomic % with respect to each other, optionally two of the at least four elements that are each present in the high entropy alloy in an amount of from 5 to 35 atomic % comprise Fe and Ni and the amount of the Fe and Ni vary by no more than 5 atomic % with respect to each other, optionally two of the at least four elements that are each present in the high entropy alloy in an amount of from 5 to 35 atomic % comprise Cr and Ni and the amount of the Ni and Cr vary by no more than 5 atomic % with respect to each other, optionally two of the at least four elements that are each present in the high entropy alloy in an amount of from 5 to 35 atomic % comprise Fe and Al and the amount of the Fe and Al vary by no more than 5 atomic % with respect to each other, optionally two of the at least four elements that are each present in the high entropy alloy in an amount of from 5 to 35 atomic % comprise Al and Ni and the amount of the Al and Ni vary by no more than 5 atomic % with respect to each other, and optionally two of the at least four elements that are each present in the high entropy alloy in an amount of from 5 to 35 atomic % comprise Al and Cr and the amount of the Al and Cr vary by no more than 5 atomic % with respect to each other. Optionally three of the at least four elements that are each present in the high entropy alloy in an amount of from 5 to 35 atomic % comprise Fe, Ni, and Cr and the amount of the Fe, Ni, and Cr vary by no more than 5 atomic % with respect to each other, optionally three of the at least four elements that are each present in the high entropy alloy in an amount of from 5 to 35 atomic % comprise Fe, Al, and Ni and the amount of the Fe, Al, and Ni vary by no more than 5 atomic % with respect to each other, optionally three of the at least four elements that are each present in the high entropy alloy in an amount of from 5 to 35 atomic % comprise Al, Cr, and Ni and the amount of the Al, Ni, and Cr vary by no more than 5 atomic % with respect to each other, and optionally three of the at least four elements that are each present in the high entropy alloy in an amount of from 5 to 35 atomic % comprise Fe, Cr, and Al and the amount of the Fe, Cr, and Al vary by no more than 5 atomic % with respect to each other.

In accordance with one embodiment, a method of making a multi-material component is provided that includes providing a first member comprising a metal or a metal alloy, providing a second member comprising a metal or a metal alloy that is different from the metal or metal alloy of the first member, and joining the first member to the second member with a third member comprising a high entropy alloy to form the multi-material component. Optionally, the step of joining the first member to the second member with the third member includes positioning the third member between the first member and the second member, and spot welding the first member to the third member and spot welding the second member to the third member. Optionally, the third member is a consumable material and the step of joining the first member to the second member with the third member comprises: melting the consumable material to deposit the high entropy alloy on the first member and the second member. Optionally, the high entropy alloy may comprise a mixing entropy of greater than 1.3R, and optionally may comprise a mixing entropy of greater than 1.5 R. Optionally, the high entropy alloy comprises at least four elements each present in an amount from 5 to 35 atomic % of the high entropy alloy. Optionally two of the at least four elements that are each present in the high entropy alloy in an amount of from 5 to 35 atomic % comprise Fe and Cr and the amount of the Fe and Cr vary by no more than 5 atomic % with respect to each other, optionally two of the at least four elements that are each present in the high entropy alloy in an amount of from 5 to 35 atomic % comprise Fe and Ni and the amount of the Fe and Ni vary by no more than 5 atomic % with respect to each other, optionally two of the at least four elements in the high entropy alloy that are each present in an amount of from 5 to 35 atomic % comprise Cr and Ni and the amount of the Ni and Cr vary by no more than 5 atomic % with respect to each other, optionally two of the at least four elements that are each present in the high entropy alloy in an amount of from 5 to 35 atomic % comprise Fe and Al and the amount of the Fe and Al vary by no more than 5 atomic % with respect to each other, optionally two of the at least four elements that are each present in the high entropy alloy in an amount of from 5 to 35 atomic % comprise Al and Ni and the amount of the Al and Ni vary by no more than 5 atomic % with respect to each other, and optionally two of the at least four elements that are each present in the high entropy alloy in an amount of from 5 to 35 atomic % comprise Al and Cr and the amount of the Al and Cr vary by no more than 5 atomic % with respect to each other. Optionally three of the at least four elements that are each present in the high entropy alloy in an amount of from 5 to 35 atomic % comprise Fe, Ni, and Cr and the amount of the Fe, Ni, and Cr vary by no more than 5 atomic % with respect to each other, optionally three of the at least four elements that are each present in the high entropy alloy in an amount of from 5 to 35 atomic % comprise Fe, Al, and Ni and the amount of the Fe, Al, and Ni vary by no more than 5 atomic % with respect to each other, optionally three of the at least four elements that are each present in the high entropy alloy in an amount of from 5 to 35 atomic % comprise Al, Cr, and Ni and the amount of the Al, Ni, and Cr vary by no more than 5 atomic % with respect to each other, and optionally three of the at least four elements that are each present in the high entropy alloy in an amount of from 5 to 35 atomic comprise Fe, Cr, and Al and the amount of the Fe, Cr, and Al vary by no more than 5 atomic % with respect to each other.

DETAILED DESCRIPTION

Figure 1:
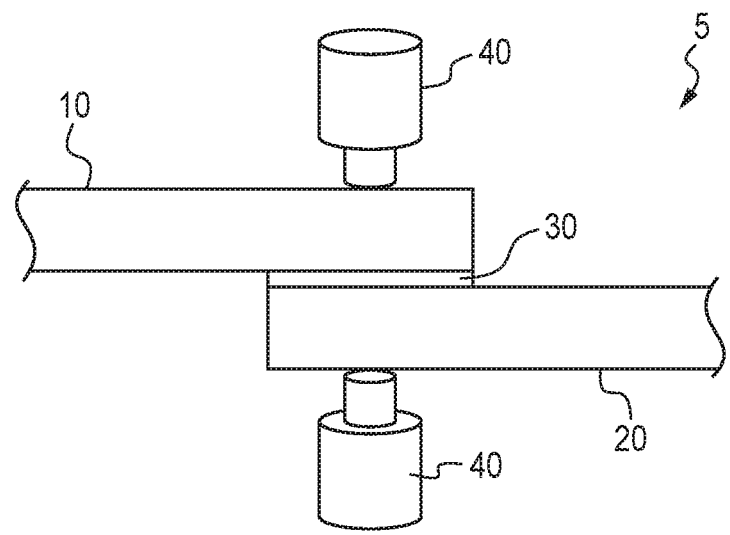
FIG. 1 illustrates a multi-material component joined by spot welding according to one aspect of the present disclosure.

It should be understood that the description and drawings herein are merely illustrative and that various modifications and changes can be made in the compositions, methods and structures disclosed without departing from the present disclosure.

In general, a high entropy alloy is provided for the joining of dissimilar metals or metal alloys. The high entropy alloy comprises of equiamount or near equiamount of multiple principal elements. High entropy alloys promote formation of a solid solution and prohibit intermetallics especially at high temperatures. Accordingly, the structure of the solution phases is simply face-centered cubic (FCC) or body centered cubic BCC or a combination of the two, as opposed to a multi-phase structure, which is typically seen in conventional alloy materials. In an illustrative example, the high entropy alloy comprises a single phase solid solution with an FCC crystal structure. Such high entropy alloys may have unique physical and mechanical properties because they still have simple crystal structure but their lattices are highly distorted due to atomic size misfit. The structure can also be adjusted by changing the composition level, i.e. it can be transferred from FCC to BCC while increasing the amount of, for example, Al content in an aluminum-containing high entropy alloy. The solid solution phases of the high entropy alloys are stabilized by the significantly high entropy of mixing compared with intermetallic compounds, especially at high temperatures.

The entropy of mixing can be determined using the equation $\Delta S_{mix}=R\ln N$, where R is the gas constant and N is the total number of elements. The value of the mixing entropy reaches a maximum value when the composition is near equi-atomic. In a non-limiting example, the high entropy alloy may comprise four or more principal elements and have a mixing entropy ($\Delta S_{mix}$) of greater than 1.3R where R is a gas constant (8.314 J/K mole). Optionally, the high entropy alloy may comprise four or more principal elements and have a $\Delta S_{mix}$ of greater than 1.5R. In a non-limiting example, the high entropy alloy may comprise four or more principal elements, and the four or more principal elements may each comprise from 5 to 90 atomic % of the high entropy alloy, and optionally the high entropy alloy may comprise at least four principal elements with each principal element present in an amount of from 5 to 35 atomic % of the high entropy alloy. Principal elements may include, but are not limited to, Fe, Co, Ni, Hf, Si, B, Cu, Al, Mg, W, Ta, Nb, Cr, Sn, Zr, Ti, Pd, Au, Pt, Ag, Ru, Mo, V, Re, Bi, Cd, Pb, Ge, Sb, and Mn. For example, the high entropy alloy may comprise four or more of Al: 5-90 atomic %, Fe: 5-90 atomic %, Mn: 5-90 atomic %, Ni: 5-90 atomic %, and Cr: 5-90 atomic %. Optionally, the high entropy alloy may comprise at least four or more principal elements wherein at least four of the principal elements each comprise from 5 to 35 atomic % of the high entropy alloy. In an illustrative example, the high entropy alloy comprises four or more of: Al: 5-35 atomic %, Fe: 5-35 atomic %, Mn: 5-35 atomic %, Ni: 5-35 atomic %, and Cr: 5-35 atomic %.

The principal elements of the high entropy alloy may be present in an equimolar amount, or in a near-equimolar amount. Optionally, at least four of the principal elements of the high entropy alloy may be present in an equimolar amount, or in a near-equimolar amount. In a non-limiting example, relative amounts of each (or optionally two, three, four, or five of the) principal element(s) in the high entropy alloy varies no more than 15 atomic %, no more than 10 atomic %, or no more than 5 atomic %. In an illustrative example, the high entropy alloy comprises at least four principal elements, the at least four principal elements of the high entropy alloy comprise at least 90 atomic % of the high entropy alloy, and the relative amounts of at least four principal elements of the high entropy alloy vary by no more than 5 atomic %. For example, the high entropy alloy may comprise five principal elements and the relative amounts of each of the principal elements in the high entropy alloy varies no more than 5 atomic %, such as a high entropy alloy that comprises Al, Fe, Mn, Ni, and Cr.

The high entropy alloy may consist only of principal elements except for impurities ordinarily associated with the principal elements or methods of making the high entropy alloy. Optionally, the high entropy alloy may contain one or more minor elements each comprising less than 5 atomic % of the high entropy alloy. Illustrative examples include Fe, Co, Ni, Hf, Si, B, Cu, Al, Mg, W, Ta, Nb, Cr, Sn, Zr, Ti, Pd, Au, Pt, Ag, Ru, Mo, V, Re, Bi, Cd, Pb, Ge, Sb, Mn, Zn and mixtures thereof. In an illustrative example, the total amount of minor elements present in the high entropy alloy is less than or equal to 30 atomic %, optionally less than equal to 20 atomic %, optionally less than or equal to 10 atomic %, optionally less than 5 atomic %, optionally less than 2.5 atomic %, or optionally less than 1.0 atomic %.

The principal elements of the high entropy alloy may comprise at least 70 atomic % of the high entropy alloy, optionally at least 80 atomic % of the high entropy alloy, optionally at least 90 atomic % of the high entropy alloy, and optionally at least 95 atomic % of the high entropy alloy. In a non-limiting example, the principal elements of the high entropy alloy may comprise from 85 atomic % to 95 atomic % of the high entropy alloy.

The high entropy alloy can be formed by a variety of methods including, but not limited to, melting and casting, forging, or powder metallurgy. In a non-limiting example, the high entropy alloy may be produced by using liquid-phase methods include arc melting and induction melting, by using solid-state processing such as the use of a high-energy ball mill, gas-phase processing including sputtering, or by thermal spraying, laser cladding, or electrodeposition.

FIGS. 1-9B provide illustrative examples of multi-material components joined by the high entropy alloys of the present disclosure, methods of joining multi-material components with the high entropy alloys of the present disclosure, and welding consumables comprising the high entropy alloys or precursors of the high entropy alloys of the present disclosure.

As shown in FIG. 1, a multi-material component 5 may be provided that includes a first member 10 comprising a metal or a metal alloy including a base metal, a second member 20 comprising a metal or a metal alloy including a base metal, and a third member 30 joining the first member 10 to the second member 20. The metal or metal alloy of the first member 10 is different than the metal or metal alloy of the second member 20. In an illustrative example, the first member 10 comprises an aluminum alloy and the second member 20 comprises steel. The third member 30 comprises the high entropy alloy and may be entirely or at least partially positioned between the first member 10 and the second member 20. The third member 30 may be in the form of a plate, a sheet, a foil, or the like, and the first member 10 and the second member 20 may be joined to the third member 30 by one or more welds, mechanical fasteners, adhesives, or any combination thereof. Optionally, the third member 30 may be in the form of a coating or cladding on one or both of the first member 10 and the second member 20. Accordingly, the third member 30 may be at least partially positioned between the first member 10 and the second member 20 to provide physical separation therebetween and function as an insulator to facilitate reduction of the galvanic potential between the first member 10 and the second member 20. In a non-limiting example, the first member 10 and the second member 20 are spot welded to the third member 30 with electrodes of a resistance spot welding device 40. In a non-limiting example, the third member 30 may be in the form of a sheet or a foil strip that has a thickness of from 0.10 mm to 1.0 mm, optionally from 0.15 mm to 0.6 mm, optionally from 0.25 mm to 0.5 mm, and optionally 0.4 mm. Optionally, the third member consists only of the high entropy alloy.

It is to be understood that the third member 30 may be secured to the first member 10 or the second member 20 prior to the spot welding operation. In an illustrative example, the third member 30 is secured to the first member 10, the first member 10 is then positioned opposite the second member 20 with the third member 30 positioned between the first member 10 and the second member 20, followed by the spot welding operation that forms a weld nugget that extends through a portion of each of the first member 10, the second member 20, and the third member 30 to join or otherwise secure the first member 10 to the second member 20 to form the multi-material component 5. It is to be understood that the third member 30 may be secured to the first member 10 or the second member 20 using any suitable method. Illustrative examples include adhesives, mechanical fasteners, welds, and cladding of the third member 30 to one or both of the first member 10 and the second member 20.

Although FIG. 1 includes only a single third member 30 for joining the first member 10 to the second member 20, it is to be understood that any number of third members 30 may be positioned between the first member 10 and the second member 20 for the purposes of joining (such as by spot welding) the first member 10 to the second member 20. It is also to be understood that the third member 30 may comprise more than one high entropy alloy. In an illustrative example, the third member 30 may comprise a first high entropy alloy that is particularly suitable for joining (such as spot welding) to the first member 10 and a second high entropy alloy that is a different alloy than the first high entropy alloy and is particularly suitable for joining (such as spot welding) to the second member 20. In such a configuration, the third member 30 may comprise a laminate with the first high entropy alloy bonded (such as with an adhesive) to the second high entropy alloy. In another non-limiting example, the first high entropy alloy may be secured to the first member 10 (such as with an adhesive, weld, cladding, or mechanical fastener), the second high entropy alloy may be secured to the second member 20 (such as with an adhesive, weld, cladding, or mechanical fastener), the first member 10 may then be positioned with respect to the second member 20 with the first high entropy alloy positioned adjacent to the second high entropy alloy, and spot welding as shown in FIG. 1 may be performed to form a weld nugget that may include one or more portions of the first member 10, the first high entropy alloy, the second high entropy alloy, and the second member 20 to join the first member 10 to the second member 20.

Although the first member 10 is described herein as an aluminum alloy and the second member 20 is described herein as steel, it is to be understood that the first member 10 and the second member 20 are not limited to such. In a non-limiting example, the first member 10 can be comprised of steel, aluminum and aluminum alloys, magnesium and magnesium alloys, and titanium and titanium alloys, and the second member 20 may be comprised of steel, aluminum and aluminum alloys, magnesium and magnesium alloys, and titanium and titanium alloys. Aluminum alloys include, but are not limited, to cast and wrought alloys. Illustrative examples of steel include advanced high-strength steels such as dual phase steels 980 grade, and ultra-high strength steels. It is also to be understood that the first member 10 and the second member 20 can be the same alloys, but different grades. In an illustrative example, the first member 10 may be a 7000 series aluminum alloy such as 7075, and the second member 20 may be a 6000 series aluminum alloy such as 6061. In another illustrative example, the first member 10 may be a first steel composition such as Usibor® 1500P (commercially available from Arcelor Mittal), and the second member 20 may be a second steel composition such as JAC980YL that is different than the first steel composition. It is also to be understood that either or both of the first member 10 and the second member 20 may be coated. For example, the first member 10 may be an ultra-high strength steel such as Usibor® 1500P (commercially available from Arcelor Mittal) with an Al—Si coating, the second member 20 may be an aluminum alloy such as 7075 or 6061, and optionally the third member 30 includes at least Fe, Al, and Si as principal elements, and optionally may comprise Fe, Al, Mn, Si, Cr, and Ni as principal elements and include B as a minor element. The composition of Usibor® 1500P is summarized below in weight percentages (the rest is iron (Fe) and unavoidable impurities):

| C | Mn | Si | Ni | Cr | Cu | S | P | Al | V | Ti | B |
|---|---|---|---|---|---|---|---|---|---|---|---|
| 0.221 | 1.29 | 0.28 | 0.013 | 0.193 | 0.01 | 0.001 | 0.018 | 0.032 | 0.005 | 0.039 | 0.0038 |

In a non-limiting example, the first member 10 may be a zinc-plated steel such as JAC980YL, the second member 20 may be an aluminum alloy such as 7075 or 6061, and the third member 30 optionally includes at least Fe, Al, and Si as principal elements, and optionally may comprise Fe, Al, Mn, Si, Cr, and Ni as principal elements and include B as a minor element. JAC980YL is a high-performance high-tensile steel defined according to the Japan Iron and Steel Federation Standard.

The high entropy alloy of the third member 30 may comprise a first principal element that is the same as the metal or the base metal of the first member 10, and optionally comprises a second principal element that is the same as the metal or the base metal of the second member 20. For example, the first member 10 may comprise an aluminum alloy, the second member 20 may comprise steel, and the high entropy alloy of the third member 30 may comprise at least Al and Fe as principal elements. In a non-limiting example, the first member 10 is a coated steel, the second member 20 is an aluminum alloy, and the high entropy alloy of the third member 30 includes Fe, Al, and a third element as a principal element that is included in the coating of the steel of the second member 20. In a non-limiting example, the coating includes Si and the high entropy alloy of the third member 30 includes Fe, Al, and Si as principal elements. In another non-limiting example, the coating includes Zn and the high entropy alloy of the third member 30 includes Fe, Al, and Zn as principal elements. Optionally, the high entropy alloy of the third member 30 includes five principal elements: Al, Fe, Mn, Cr, and Ni. Optionally, the high entropy alloy of the third member 30 includes six principal elements: Al, Fe, Mn, Si, Cr, and Ni.

In a non-limiting example, the high entropy alloy of the third member 30 may comprise a first principal element that is the same as the base metal of the first member 10, a second principal element that is the same as a second or a third most abundant element of the first member 10, a third principal element that is the same as the base metal of the second member 20, and a fourth principal element that is the same as a second or a third most abundant element of the second member 20. For example, the first member 10 may be a 6061 aluminum alloy that contains Mg and Si as the second and third most abundant elements, the second member 20 may be JAC980YL zinc-coated steel that contains Mn and Cr as the second and third most abundant elements, and the third member 30 includes Al, Fe, Si, and Mn, optionally the third member 30 includes Al, Fe, Si, and Cr, and optionally the third member includes Al, Fe, Si, Mn, and Cr.

Figure 2:
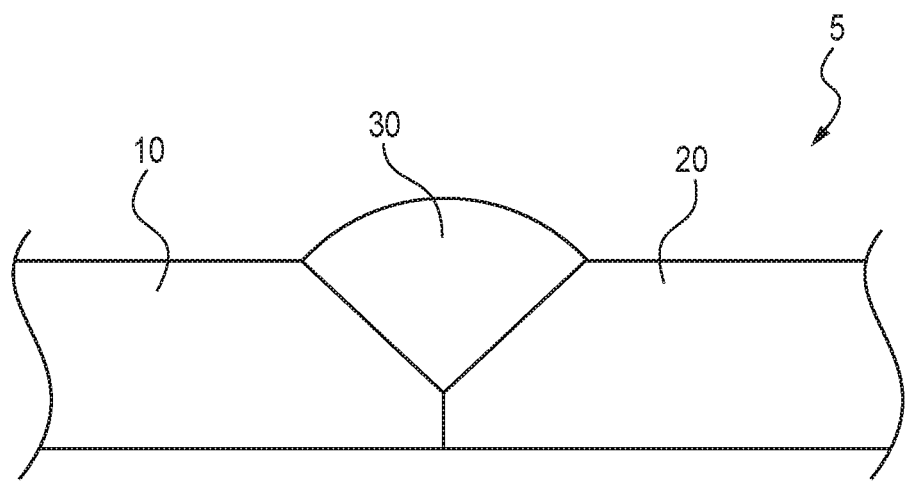
FIG. 2 illustrates a cross-sectional view of an exemplary multi-material component according to one aspect of the present disclosure.
Figure 3A:
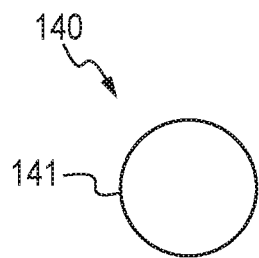
FIGS. 3A and 3B illustrate welding consumables comprising a high entropy alloy according to one aspect of the present disclosure.
Figure 3B:
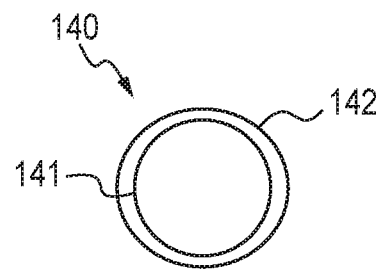

As shown in FIG. 2, the third member 30 comprising the high entropy alloy may be deposited on the first member 10 and the second member 20 to form the multi-material component 5. The third member 30 may be deposited on the first member 10 and the second member 20 without melting the first member 10 or the second member 20. As shown in FIGS. 3A and 3B, the high entropy alloy (or a high entropy alloy precursor composition) may be provided in the form of a welding consumable 140, and a heat source may be applied to the welding consumable 140 to deposit the third member 30 comprising the high entropy alloy on the first member 10 and the second member 20. It is to be understood, however, that a portion of one or both of the first member 10 and the second member 20 may be melted at the location where the third member 30 is deposited. Non-limiting examples of methods that may be used to deposit the third member 30 comprising the high entropy alloy on the first member 10 and the second member 20 include at least one of electron beam welding, laser beam welding (FIG. 4), plasma arc welding, gas metal arc welding (FIG. 5), gas tungsten arc welding (FIG. 6), laser cladding (FIGS. 7A and 7B), flux cored arc welding, and submerged arc welding.

The high entropy alloy (or high entropy alloy precursor composition) of the welding consumable 140 may include any composition described above for use with any of the first member 10 and second member 20 combinations described above. In an illustrative example, the welding consumable 140 may comprise a first principal element that is the same as the metal or the base metal of the first member 10, and optionally comprises a second principal element that is the same as the metal or the base metal of the second member 20. For example, the first member 10 comprises an aluminum alloy, the second member 20 comprises steel, and the high entropy alloy (or high entropy alloy precursor composition) of the welding consumable 140 comprises at least Al and Fe as principal elements. Optionally, the high entropy alloy (or high entropy alloy precursor composition) of the welding consumable 140 includes five principal elements: Al, Fe, Mn, Cr, and Ni.

As shown in FIGS. 3A and 3B, the welding consumable 140 may be a filler wire including a base filler material 141 comprising the high entropy alloy or a high entropy alloy precursor composition that forms a high entropy alloy when melted. A shield or flux 142 may be provided around the core base filler material 141. Alternatively, the flux 142 may be disposed in the core of the filler wire (not shown). Flux 142 is used to protect the weld area from oxidation. For example, the flux 142 may form a protective slag over the weld area to shield the weld area from the atmosphere and/or form carbon dioxide to protect the weld area. Such a flux coating is generally known and often used with self-shielding electrodes. Although the welding consumable 140 is primarily described herein with respect to a filler wire, the welding consumable 140 is not limited to such configuration and may take any suitable form including, but not limited to, foil, strip, plate, or powder forms. It is also to be understood that the welding consumable 140 may be made by any method used to make welding consumables or to form high entropy alloys. In a non-limiting example, the welding consumable 140 may be produced by using liquid-phase methods include arc melting and induction melting, by using solid-state processing such as the use of a high-energy ball mill, gas-phase processing including sputtering, or by thermal spraying, laser cladding, or electrodeposition. In a non-limiting example, the welding consumable may be a filler wire having a diameter of 0.8 mm to 5.0 mm, optionally 0.8 mm to 1.75 mm, optionally 1.50 mm to 2.5 mm, optionally 4.50 mm to 5.00 mm, optionally 1.0 mm, optionally 1.2 mm, optionally, 1.6 mm, optionally 2.0 mm, optionally 2.4 mm, and optionally 4.76 mm.

Figure 4:
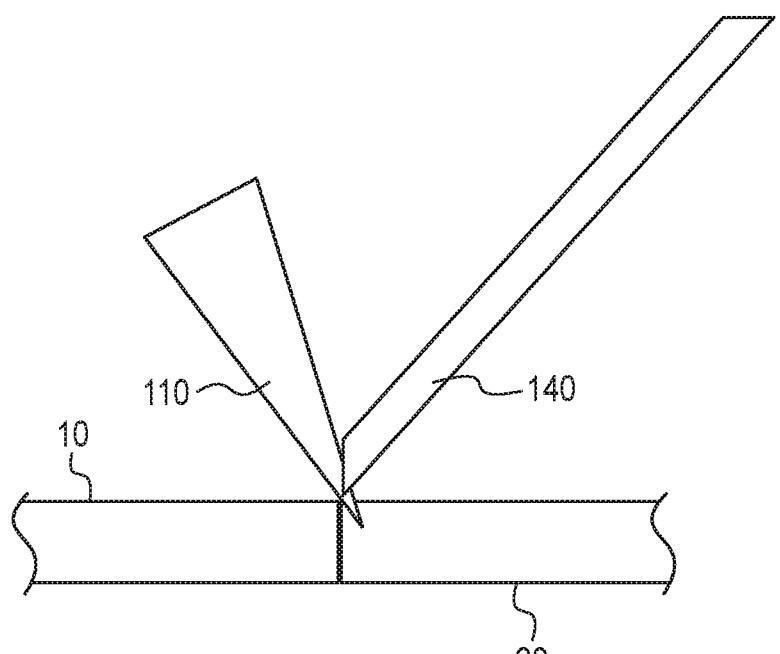
FIG. 4 illustrates a diagram of a laser system for brazing, cladding, building up, filling, hard-facing, overlaying, welding, and joining applications with a high entropy alloy according to one aspect of the present disclosure.
Figure 5:
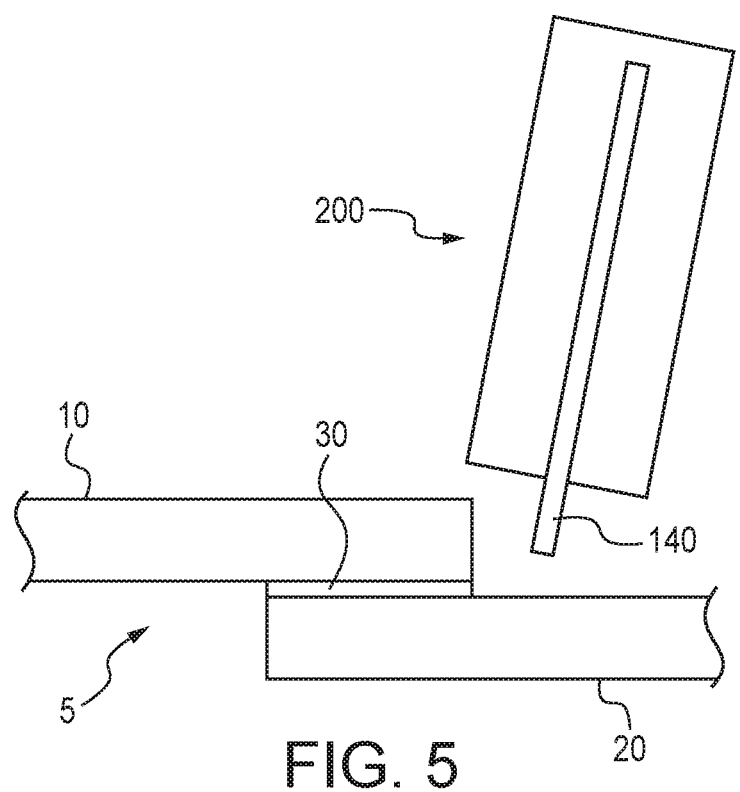
FIG. 5 illustrates a diagram of a gas metal arc welding system for brazing, cladding, building up, filling, hard-facing, overlaying, welding, and joining applications with a high entropy alloy according to one aspect of the present disclosure.
Figure 6:
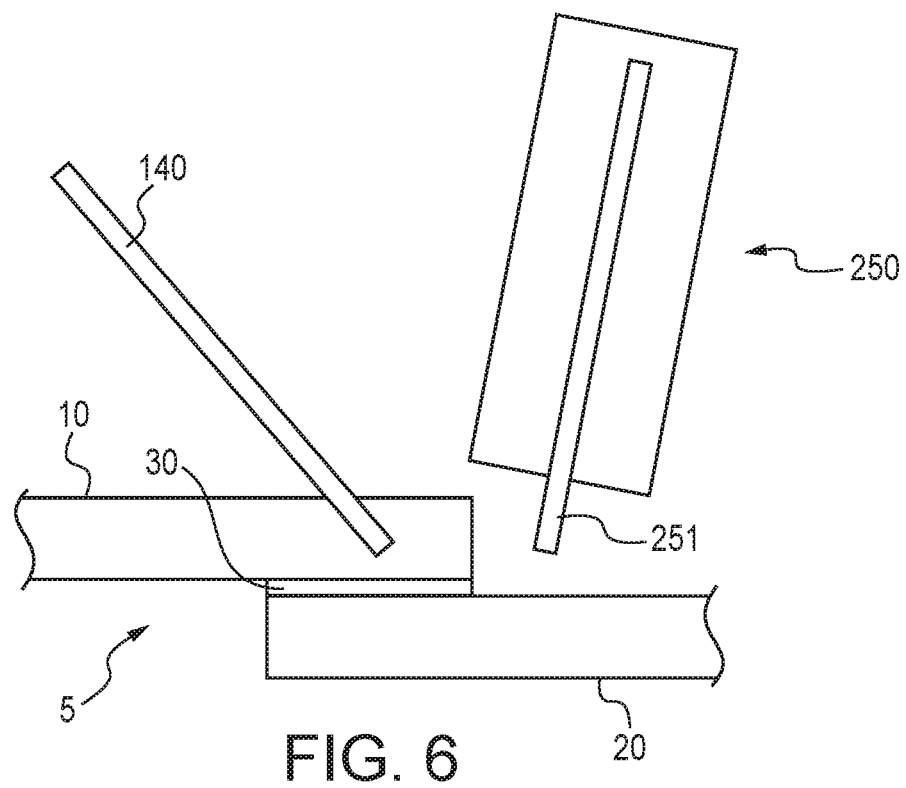
FIG. 6 illustrates a diagram of a gas tungsten arc welding system for brazing, cladding, building up, filling, hard-facing, overlaying, welding, and joining applications with a high entropy alloy according to one aspect of the present disclosure.

As shown in FIG. 4, a laser beam 110 may be applied from an energy source to melt the welding consumable 140 to join the first member 10 to the second member 20 with the high entropy alloy. As shown in FIG. 5, a metal inert gas welding device 200 is provided that is capable of melting the welding consumable 140 to join the first member 10 to the second member 20 with the third member 30 comprising the high entropy alloy. As shown in FIG. 6, a tungsten inert gas welding device 250 is provided with a non-consumable electrode 251 capable of melting the welding consumable 140 to join the first member 10 to the second member 20 with the third member 30 comprising the high entropy alloy.

Figure 7A:
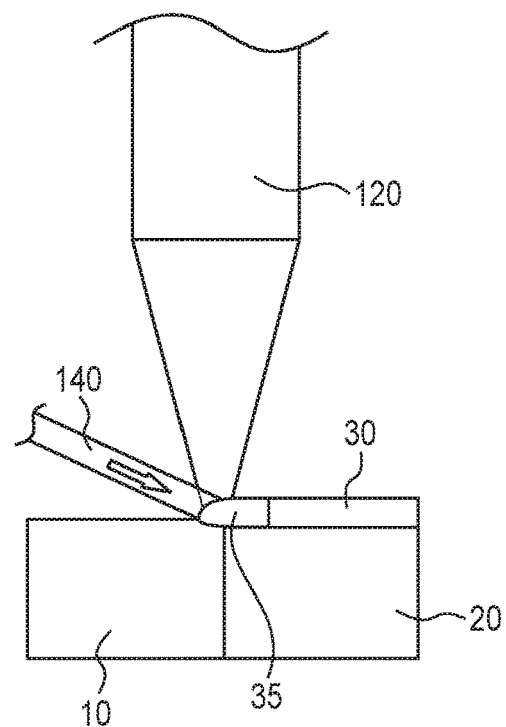
FIG. 7A illustrates a laser cladding system that uses a wire welding consumable for depositing a high entropy alloy on a substrate.
Figure 7B:
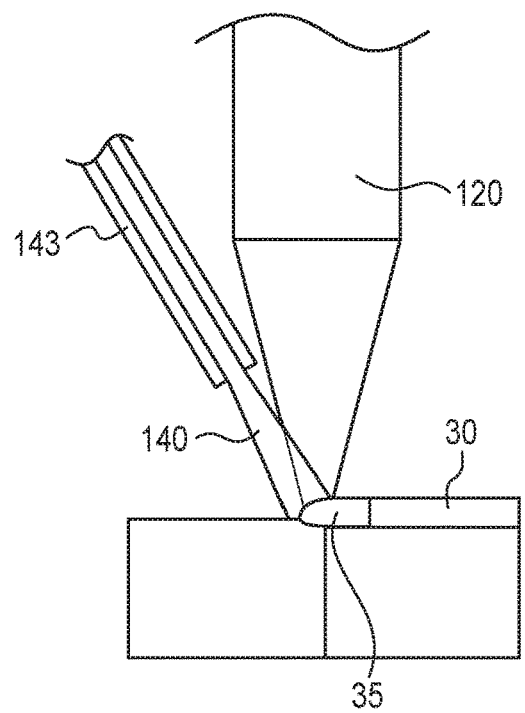
FIG. 7B illustrates a laser cladding system that uses a powder welding consumable for depositing a high entropy alloy on a substrate.

As shown in FIGS. 7A and 7B, the third member 30 may be applied to the first member 10 and the second member 20 as a cladding or weld overlay. As shown in FIG. 7A, a laser 120 may be provided for applying a laser beam to the welding consumable 140 (in the form of a wire) to form a melt pool 35 of the high entropy alloy that solidifies to form the third member 30 to join the first member 10 to the second member 20. As shown in FIG. 7B, the laser 120 may apply a laser beam to the welding consumable 140 that is in the form of a powder. The powder welding consumable 140 is fed via an injection nozzle 143 to the laser 120 where a laser beam contacts the powder welding consumable 140 to form a melt pool 35 of the high entropy alloy that solidifies to form the third member 30. It is to be understood that the powder welding consumable 140 may be a powder form of the high entropy alloy, or may be a mixture of metal or metal alloy powders that are melted by the laser 120 to form the high entropy alloy. Although the cladding or overlaying of the third member 30 is described with respect to a laser 120, it is to be understood that the cladding or overlaying of the third member 30 can be applied using any suitable process including, but not limited to, manual metal arc welding, gas tungsten arc welding, gas metal arc welding, submerged arc welding, flux cored arc welding, and plasma transferred arc welding.

Figure 8:
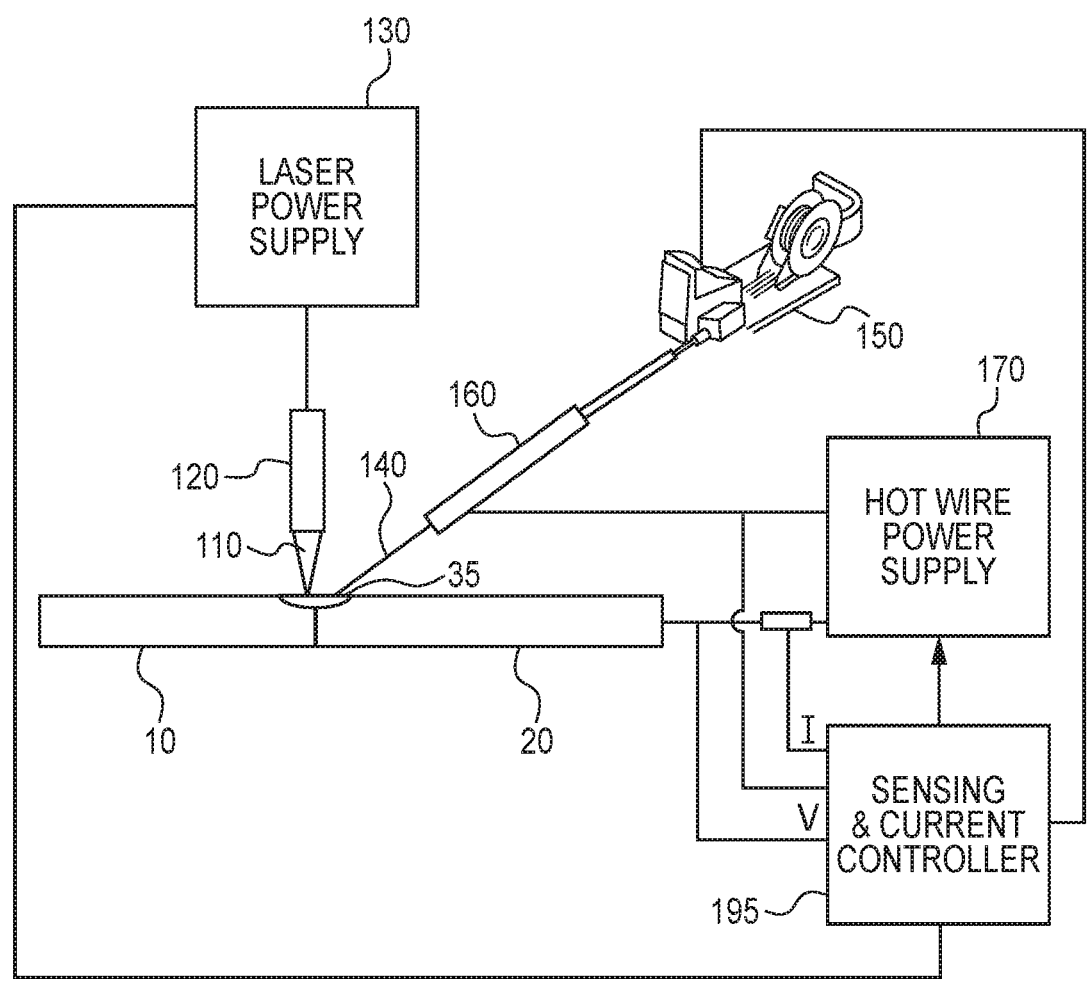
FIG. 8 illustrates a functional schematic block diagram of a combination wire welding consumable feeder and energy source system for any of brazing, cladding, building up, filling, hard-facing, overlaying, welding, and joining applications with a high entropy alloy according to one aspect of the present disclosure.

As shown in FIG. 8, a high energy heat source may be provided for performing any of brazing, cladding, building up, filling, hard-facing overlaying, and joining/welding applications with the welding consumable 140. The high energy heat source is capable of heating one of the first member 10, the second member 20, the welding consumable 140, or any combination thereof to form the melt pool 35. The high energy heat source can be a laser subsystem 130/120 that includes a laser device 120 and a laser power supply 130 operatively connected to each other. The laser 120 is capable of focusing a laser beam 110 onto one of the first member 10, the second member 20, and the welding consumable 140, or any combination thereof, and the power supply 130 provides the power to operate the laser device 120. The laser subsystem 130/120 can be any type of high energy laser source, including but not limited to carbon dioxide, Nd:YAG, Yb-disk, YB-fiber, fiber delivered, or direct diode laser systems. Further, white light or quartz laser type systems can be used if they have sufficient energy. Although the high energy heat source is described with respect to a laser system, it is to be understood that this reference is exemplary and any high intensity energy source may be used. Other non-limiting examples of the high energy heat source may include at least one of an electron beam, a plasma arc welding subsystem, a gas tungsten arc welding subsystem, a gas metal arc welding subsystem, a flux cored arc welding subsystem, and a submerged arc welding subsystem.

A filler wire feeder subsystem may be provided that is capable of providing at least one welding consumable 140 to the vicinity of the laser beam 110. It is understood that the molten puddle, i.e., melt pool 35, may be considered only part of the high entropy alloy from the welding consumable 140, or part of one or both of the first member 10 and the second member 20 with the high entropy alloy from the welding consumable 140. The filler wire feeder subsystem may include a filler wire feeder 150, a contact tube 160, and a wire power supply 170. The wire welding power supply 170 may be a direct current (DC) power supply (that can be pulsed, for example), although alternating current (AC) or other types of power supplies are possible as well. The wire welding consumable 140 is fed from the filler wire feeder 150 through the contact tube 160 toward the first member 10 and/or the second member 20 and extends beyond the tube 160. During operation, the extension portion of the wire welding consumable 140 may be resistance-heated by an electrical current from the wire welding power supply 170, which may be operatively connected between the contact tube 160 and the one or both of the first member 10 and the second member 20.

Prior to its entry into the weld puddle 35, the extension portion of the wire welding consumable 140 may be resistance-heated such that the extension portion approaches or reaches the melting point before contacting the weld puddle 35. Because the wire welding consumable 140 is heated to at or near its melting point, its presence in the weld puddle 35 will not appreciably cool or solidify the melt pool 35 and the wire welding consumable 140 is quickly consumed into the melt pool 35. The laser beam 110 (or other energy source) may serve to melt some of one or both of the first member 10 and the second member 20 to form the weld puddle 35. Optionally, the laser beam 110 (or other energy source) may serve to melt only the wire welding consumable 140 to form the weld puddle 35. The system may also include a sensing and control unit 195. The sensing and control unit 195 can be operatively connected to the power supply 170, the wire feeder 150, and/or the laser power supply 130 to control the welding process.

In a non-limiting example, the multi-material component 5 is an automotive component. In an illustrative example, the first member 10 is an aluminum alloy roof and the second member 20 is a steel vehicle body.

Figure 9A:
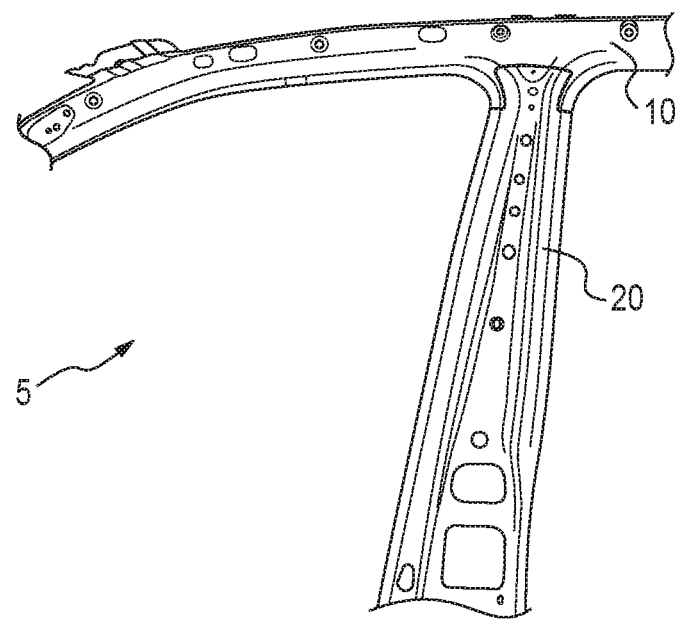
FIGS. 9A and 9B illustrate a B-pillar of a vehicle secured to a roof rail of the vehicle.
Figure 9B:
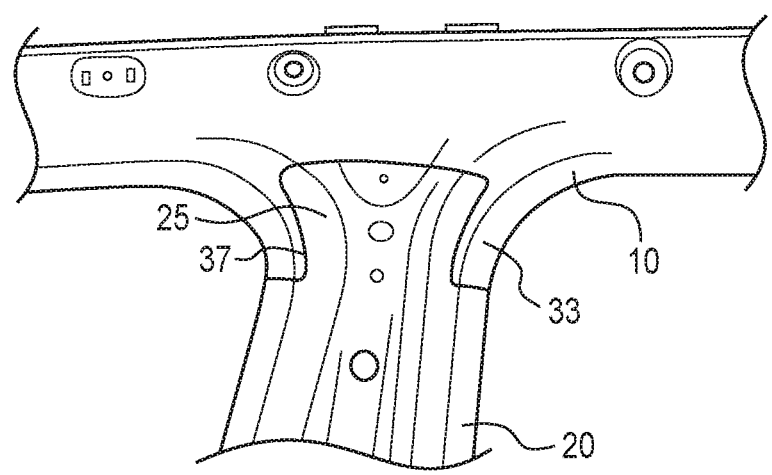

In a non-limiting example as shown in FIGS. 9A and 9B, the multi-material component 5 may include a first member 10 that is an aluminum alloy roof rail and a second member 20 that is a steel B-pillar. The first member 10 may be secured to the second member 20 with the third component 30 comprising the high entropy alloy using any of the methods disclosed herein. As shown in FIGS. 9A and 9B, a first end 25 of the second member 20 may overlap a portion 33 of the first member 10 that extends downwardly toward a side sill (not shown) that may be comprised of either an aluminum alloy or steel. An edge 37 of the first end 25 of the second member 20 may be welded to the first member 10 with the welding consumable 140 to deposit the third member 30 comprising the high entropy alloy on the first member 10 and the second member 20. In addition to, or alternatively, the third member 30 may be in the form of a plate, a sheet, or the like, and the first member 10 and the second member 20 may be joined to the third member 30 by one or more welds, mechanical fasteners, adhesives, or any combination thereof. In a non-limiting example, the third member 30 is a sheet that is positioned between the first end 25 of the second member 20 and the portion 33 of the first member 10, and the first member 10 and the second member 20 are then spot welded to the third member 30 with a resistance spot welding device 40.

While, for purposes of simplicity of explanation, the methods have steps described as executing serially, it is to be understood and appreciated that the present disclosure is not limited by the illustrated order, and some steps could occur in different orders and/or concurrently with other steps from that shown and described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A multi-material component comprising:
a first member comprising a first steel, wherein the first member comprises a coating;
a second member comprising a second steel that is a different composition than the first steel; and
a third member welded to the first member and the second member, the third member comprising a high entropy alloy, the high entropy alloy is a solid solution comprising a face-centered cubic single phase solid solution or a body-centered cubic single phase solid solution, or a combination of face-centered cubic and body-centered cubic phases, the high entropy alloy comprises at least four principal elements,
wherein each of the at least four principal elements comprises at least 5 atomic % of the high entropy alloy, relative amounts of each of the at least four principal elements vary no more than 15 atomic %, and the high entropy alloy comprises a mixing entropy of greater than 1.3R, wherein the entropy of mixing is determined using the equation $\Delta S_{mix}=R\ln N$, wherein R is the gas constant and N is the total number of elements.

2. The multi-material component of claim 1, wherein the first steel comprises Mn, and wherein the high entropy alloy of the third member comprises Mn as one of the at least four principal elements.

3. The multi-material component of claim 2, wherein the first steel comprises Mn as the second most abundant element of the first steel.

4. The multi-material component of claim 2, wherein the coating of the first member comprises Zn.

5. The multi-material component of claim 4, wherein the second member comprises a coating, wherein the coating of the second member comprises Al and Si.

6. The multi-material component of claim 5, wherein the second steel comprises Mn as the second most abundant element of the second steel.

7. The multi-material component of claim 6, wherein the high entropy alloy of the third member comprises Fe as one of the at least four principal elements.

8. A multi-material component comprising:
a first member comprising a first steel, wherein the first member comprises a coating;
a second member comprising a second steel that is a different composition than the first steel; and
a third member welded to the first member and the second member, the third member comprising a high entropy alloy, the high entropy alloy is a solid solution comprising a face-centered cubic single phase solid solution or a body-centered cubic single phase solid solution, or a combination of face-centered cubic and body-centered cubic phases, the high entropy alloy comprises at least four principal elements and two of the at least four principal elements are Mn and Fe,
wherein each of the at least four principal elements comprises at least 5 atomic % of the high entropy alloy, the at least four principal elements comprise at least 70 atomic % of the high entropy alloy, and the high entropy alloy comprises a mixing entropy of greater than 1.3R, wherein the entropy of mixing is determined using the equation $\Delta S_{mix}=R\ln N$, wherein R is the gas constant and N is the total number of elements.

9. The multi-material component of claim 8, wherein the coating of the first member comprises Zn.

10. The multi-material component of claim 9, wherein the first steel comprises Mn.

11. The multi-material component of claim 10, wherein the first steel comprises Mn as the second most abundant element of the first steel.

12. The multi-material component of claim 11, wherein the first steel is a dual phase steel.

13. The multi-material component of claim 12, wherein the second member comprises a coating, wherein the coating of the second member comprises Al and Si.

14. A multi-material component comprising:
a first member comprising a first steel, wherein the first member comprises a coating, and wherein the coating of the first member comprises at least Zn, Al or Si;
a second member comprising a second steel that is a different composition than the first steel; and
a third member welded to the first member and the second member, the third member comprising a high entropy alloy, the high entropy alloy is a solid solution comprising a face-centered cubic single phase solid solution or a body-centered cubic single phase solid solution, or a combination of face-centered cubic and body-centered cubic phases, the high entropy alloy comprises at least four principal elements,
wherein each of the at least four principal elements comprises at least 5 atomic % of the high entropy alloy, relative amounts of each of the at least four principal elements vary no more than 15 atomic %, and the high entropy alloy comprises a mixing entropy of greater than 1.3R, wherein the entropy of mixing is determined using the equation $\Delta S_{mix}=R\ln N$, wherein R is the gas constant and N is the total number of elements.

15. The multi-material component of claim 14, wherein the first steel comprises Mn as the second most abundant element of the first steel.

16. The multi-material component of claim 15, wherein the second steel comprises Mn as the second most abundant element of the second steel.

17. The multi-material component of claim 16, wherein the high entropy alloy of the third member comprises Mn as one of the at least four principal elements.

18. The multi-material component of claim 17, wherein the first steel is a dual phase steel.

19. The multi-material component of claim 18, wherein the coating of the first member comprises Zn.

20. The multi-material component of claim 19, wherein the third member is positioned between the first member and the second member, and wherein the first member and the second member are spot welded to the third member.

* * * * *